US010670724B2

(12) United States Patent
Moon et al.

(10) Patent No.: US 10,670,724 B2
(45) Date of Patent: Jun. 2, 2020

(54) LIGHT DETECTION AND RANGING (LIDAR) TIME OF FLIGHT (TOF) SENSOR CAPABLE OF INPUTTING AND OUTPUTTING SIMULTANEOUSLY AND 3-DIMENSIONAL LASER SCANNING SYSTEM INCLUDING THE SAME

(71) Applicant: KOREA ELECTRONICS TECHNOLOGY INSTITUTE, Seongnam-si, Gyeonggi-do (KR)

(72) Inventors: Yeon Kug Moon, Seoul (KR); Young Bo Shim, Seoul (KR)

(73) Assignee: Korea Electronics Technology Institute, Seongnam-si (KR)

( * ) Notice: Subject to any disclaimer, the term of this patent is extended or adjusted under 35 U.S.C. 154(b) by 406 days.

(21) Appl. No.: 15/595,394

(22) Filed: May 15, 2017

(65) Prior Publication Data

US 2017/0329014 A1 Nov. 16, 2017

(30) Foreign Application Priority Data

May 13, 2016 (KR) ........................ 10-2016-0058959

(51) Int. Cl.
*G01S 17/89* (2020.01)
*G01S 7/491* (2020.01)
*G01S 7/4912* (2020.01)

(52) U.S. Cl.
CPC ............ *G01S 17/89* (2013.01); *G01S 7/4912* (2013.01)

(58) Field of Classification Search
CPC ............................... G01S 17/89; G01S 7/4912
USPC ........................................................ 356/5.01
See application file for complete search history.

(56) References Cited

U.S. PATENT DOCUMENTS

2005/0205954 A1* 9/2005 King ................. H01L 27/14632 257/431
2016/0099429 A1* 4/2016 Bruder .................. H01L 27/307 348/374
2016/0181293 A1* 6/2016 McGarvey .......... H01L 27/1446 257/290

FOREIGN PATENT DOCUMENTS

KR 10-1417431 B1 7/2014

* cited by examiner

*Primary Examiner* — Daniel L Murphy
(74) *Attorney, Agent, or Firm* — Knobbe Martens Olson & Bear LLP

(57) ABSTRACT

A light detection and ranging (LIDAR) time of flight (TOF) sensor for inputting and outputting simultaneously and 3-dimensional laser scanning system including the same are disclosed. In one aspect, the sensor includes a substrate and a light receiving element array provided on the substrate and including a plurality of light receiving elements. The sensor also includes readout circuits configured to receive electrical signals from the light receiving elements and perform signal processing on the electrical signals. The sensor further includes metal lines disposed on the light receiving element array in parallel, provided to correspond to the number of the light receiving elements, and configured to connect the light receiving elements to the readout circuits in one-to-one correspondence.

3 Claims, 20 Drawing Sheets

REFLECTED LIGHT
22
50
21
24
21
23
11
30

LIGHT DETECTION AND RANGING (LIDAR) TIME OF FLIGHT (TOF) SENSOR CAPABLE OF INPUTTING AND OUTPUTTING SIMULTANEOUSLY AND 3-DIMENSIONAL LASER SCANNING SYSTEM INCLUDING THE SAME

CROSS-REFERENCE TO RELATED APPLICATIONS

This application claims priority from and the benefit of Korean Patent Application No. 10-2016-0058959, filed on May 13, 2016 in the Korean Intellectual Property Office (KIPO), the disclosure of which is hereby incorporated by reference herein in its entirely.

BACKGROUND

Field

The described technology generally relates to a light detection and ranging (LIDAR) time of flight (ToF) sensor capable of inputting and outputting simultaneously and a 3-dimensional (3D) laser scanning system including the same.

Description of the Related Art

Light detection and ranging (LIDAR) is one of remote detection apparatuses that can irradiate a target object with light (e.g., a laser beam), analyze light reflected by the corresponding object, and measure distance, direction, velocity, temperature, material distribution, concentration property, and the like of the corresponding object. The LIDAR may more precisely measure physical properties (temperature, material distribution, concentration property, etc.), distance, direction, and velocity of an object by utilizing an advantage of a laser that can generate a pulse signal having a high energy density and a short period.

The LIDAR is being used in various fields such as 3-dimensional (3D) image acquisition, meteorological observation, measurement of velocity or distance of an object, automatic driving, and the like by using a laser beam source having a specific wavelength or a laser beam source of which a wavelength is changeable as a light source. For example, the LIDAR is being used for precise analysis of atmospheric and global environmental observations by being mounted on aircraft, satellites, and the like, and is being used as a means for compensating for a camera function such as distance measurement to an object and the like by being mounted on spacecraft and exploration robots. In addition, on the ground, technologies for LIDAR sensors having a simple form for long-distance measurement, car speed enforcement, and the like are being commercialized. Recently, the LIDAR is being used for 3D reverse engineering, autonomous cars, and the like by being used as a laser scanner or a 3D video camera.

A 3D laser scanner type of LIDAR which is recently widely used includes a head including a plurality of laser outputting devices and a plurality of laser sensors, and mechanically rotates the head using a motor. However, since such a type of LIDAR uses the plurality of laser outputting devices and the plurality of laser sensors, it is expensive and has a limitation that a viewing update period depends on a rotational velocity of its head.

Korea Patent No. 10-1417431, which relates to a 3D spatial information generation system using a LIDAR sensor, provides a 3D spatial information generation system using a LIDAR sensor including a two-dimensional (2D) LIDAR sensor unit mounted on the center of the outside of a vehicle wheel and configured to rotate with the wheel, an angle sensor configured to measure the rotation angle of the vehicle wheel, and a processing unit configured to generate 3D spatial information by reflecting the rotation angle measured by the angle sensor on 2D information measured by the LIDAR sensor unit.

SUMMARY

One inventive aspect relates to a light detection and ranging (LIDAR) time of flight (ToF) sensor capable of inputting and outputting simultaneously that may scan omni-directionally in 360 degrees using a laser beam source, and a 3-dimensional (3D) laser scanning system including the same.

Another aspect is a LIDAR ToF sensor capable of inputting and outputting simultaneously, which may scan omni-directionally in 360 degrees without mechanical rotation, and a 3D laser scanning system including the same.

Another aspect is a LIDAR ToF sensor capable of inputting and outputting simultaneously, in which manufacturing costs may be reduced without reducing performance, and a 3D laser scanning system including the same.

Another aspect is a LIDAR ToF sensor capable of inputting and outputting simultaneously while minimizing a chip area, and a 3D laser scanning system including the same.

Another aspect is a LIDAR ToF sensor capable of inputting and outputting simultaneously, in which a signal in a noise wavelength band which is incident according to an arrangement of metal lines may be blocked and a signal in a desired wavelength band may be received, and a 3D laser scanning system including the same.

According to an aspect of the present invention, there is provided a LIDAR ToF sensor capable of inputting and outputting simultaneously. The sensor includes a substrate, a light receiving element array provided on the substrate and including a plurality of light receiving elements, readout circuits configured to receive electrical signals from the light receiving elements and perform signal processing on the electrical signals, and metal lines disposed on the light receiving element array in parallel, provided to correspond to the number of the light receiving elements, and configured to connect the light receiving elements to the readout circuits in one-to-one correspondence.

The metal lines may include a first signal line connected to an active area of the light receiving element and the readout circuit and second signal lines arranged on the first signal line and the active area of the light receiving element in parallel.

The metal lines may include a contact which electrically connects the first signal line to the readout circuit and a via which electrically connects the first signal line to the second signal lines.

A thickness of the second signal line and an arrangement interval between the signal lines may be determined by a cut-off wavelength band.

The thickness of the second signal line and the arrangement interval between the signal lines may be determined so that light other than light in a wavelength band of 905 nm or 1,550 nm is blocked.

The sensor may further include an insulating layer provided between the second signal lines and the light receiving element array.

According to another aspect of the present invention, there is provided a 3D laser scanning system including a laser outputting device configured to omni-directionally output a laser beam output from a laser beam source and a laser receiving device provided above or below the laser outputting device and configured to receive a laser beam reflected by an object which is located on a propagation path of a laser beam output from the laser outputting device.

The laser receiving device may include a light receiving lens configured to collect the laser beam reflected by the object, and a light receiving unit configured to receive the laser beam collected through the light receiving lens.

The light receiving unit may include a light receiving element configured to convert the laser beam into an electrical signal, and a readout circuit configured to read the electrical signal from the light receiving element and perform signal processing on the electrical signal.

A plurality of light receiving elements may be arranged in a focal plane array form.

The light receiving element may be formed to have a cylindrical shape and have a 360-degree horizontal viewing angle.

A plurality of light receiving lenses having different sizes may be disposed to concentrate light on the light receiving unit.

The light receiving unit may include a substrate, a light receiving element array provided on the substrate and including a plurality of light receiving elements arranged in a focal plane array form, readout circuits configured to receive electrical signals from the light receiving element and perform signal processing on the electrical signals, and metal lines disposed on the light receiving element array in parallel, provided to correspond to the number of the light receiving elements, and configured to connect the light receiving elements to the readout circuits in one-to-one correspondence.

The metal lines may include a first signal line connected to an active area of the light receiving element and the readout circuit and second signal lines arranged on the first signal line and the active area of the light receiving element in parallel.

The metal lines may include a contact which electrically connects the first signal line to the readout circuit and a via which electrically connects the first signal line to the second signal lines.

A thickness of the second signal line and an arrangement interval between the signal lines may be determined by a cut-off wavelength band.

The thickness of the second signal line and the arrangement interval between the signal lines may be determined so that light other than light in a wavelength band of 905 nm or 1,550 nm is blocked.

The system may further include an insulating layer provided between the second signal lines and the light receiving element array.

BRIEF DESCRIPTION OF THE DRAWINGS

The above and other objects, features and advantages of the described technology will become more apparent to those of ordinary skill in the art by describing in detail exemplary embodiments thereof with reference to the accompanying drawings, in which.

DETAILED DESCRIPTION OF CERTAIN INVENTIVE EMBODIMENTS

Figure 1:
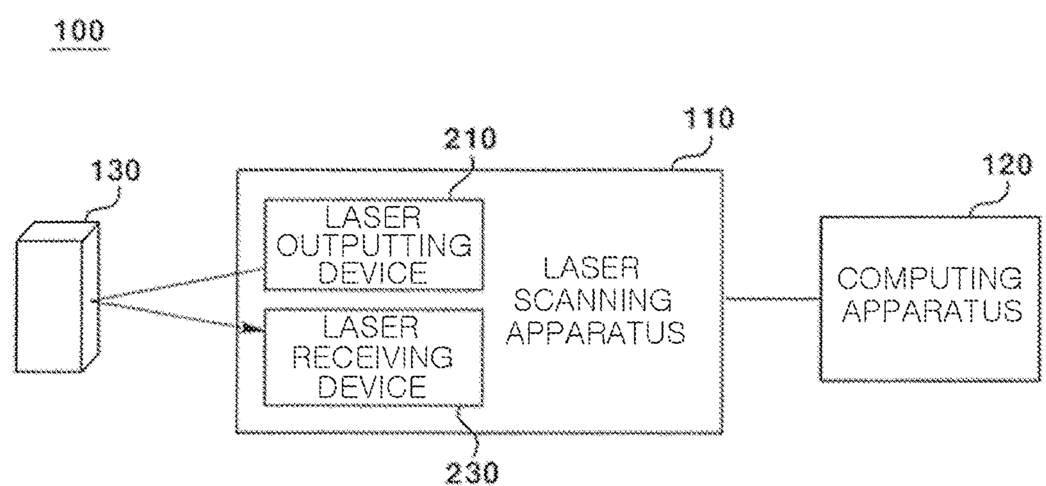
FIG. 1 is a diagram for describing a 3-dimensional (3D) laser scanning system according to one embodiment of the present invention.

While the described technology may be modified in various ways and take on various alternative forms, specific embodiments thereof are shown in the drawings and described in detail below as examples. There is no intent to limit the described technology to the particular forms disclosed; rather it should be understood that the described technology is to cover all modifications, equivalents, and alternatives falling within the spirit and scope of the appended claims.

Although the terms "first," "second," etc. may be used herein to describe various elements, these elements are not limited by these terms. These terms are only used to distinguish one element from another. For example, a first element could be referred to as a second element, and, similarly, a second element could be referred to as a first element, without departing from the scope of the described technology. As used herein, the term "and/or" includes any and all combinations of one or more of the associated listed items.

It should be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting to the described technology. As used herein, the singular forms "a" and "an" are intended to include the plural forms as well unless the context clearly indicates otherwise. It should be further understood that the terms "comprise," "comprising," "include," and/or "including,"

when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this described technology belongs. Terms, such as those defined in commonly used dictionaries, should understood as being interpreted as having a meaning that is consistent with their meaning in the context of the relevant art and not being interpreted in an idealized or overly formal sense unless expressly so defined herein.

Hereinafter, embodiments will be described in detail with reference to the accompanying drawings, the same or corresponding components are identified by the same reference number regardless of numerals in the drawings, and redundant description thereof will be omitted.

FIG. 1 is a diagram for describing a 3-dimensional (3D) laser scanning system according to one embodiment of the present invention.

Referring to FIG. 1, a 3D laser scanning system 100 includes a 3D laser scanning apparatus 110 and a computing apparatus 120.

The 3D laser scanning apparatus 110 includes a laser outputting device 210 and a laser receiving device 230. The 3D laser scanning apparatus 110 outputs laser beams omni-directionally in 360 degrees around the 3D laser scanning apparatus 110 and receives a laser beam reflected by an object 130 which is located in the vicinity thereof. In one embodiment, the 3D laser scanning apparatus 110 may correspond to light detection and ranging (LIDAR). The 3D laser scanning apparatus 110 generates an electrical signal corresponding to the received laser beam to transmit the electrical signal to the computing apparatus 120.

The laser outputting device 210 diffuses laser beams output from a laser beam source, and outputs a plurality of laser beams which are uniformly distributed in all directions of a side surface of a cylindrical diffraction grating by passing the diffused laser beams from the inside of the cylindrical diffraction grating in an outward direction of the side surface. That is, the laser outputting device 210 outputs a plurality of laser beams omni-directionally and uniformly in 360 degrees around the 3D laser scanning apparatus 110.

The laser receiving device 230 receives a laser beam of the plurality of laser beams output from the laser outputting device 210, which is reflected by the object 130 located at a predetermined position and on a propagation path. The laser receiving device 230 generates an electrical signal corresponding to the received laser beam to transmit the electrical signal to the computing apparatus 120.

The computing apparatus 120 measures a distance between the 3D laser scanning apparatus 110 and the object 130 based on the signal received from the 3D laser scanning apparatus 110. In one embodiment, the computing apparatus 120 may measure a distance between the 3D laser scanning apparatus 110 and the object based on time of flight (ToF) of the received laser beam. In one embodiment, the computing apparatus 120 may measure a direction of the object 130 based on the signal received from the 3D laser scanning apparatus 110.

Figure 2:
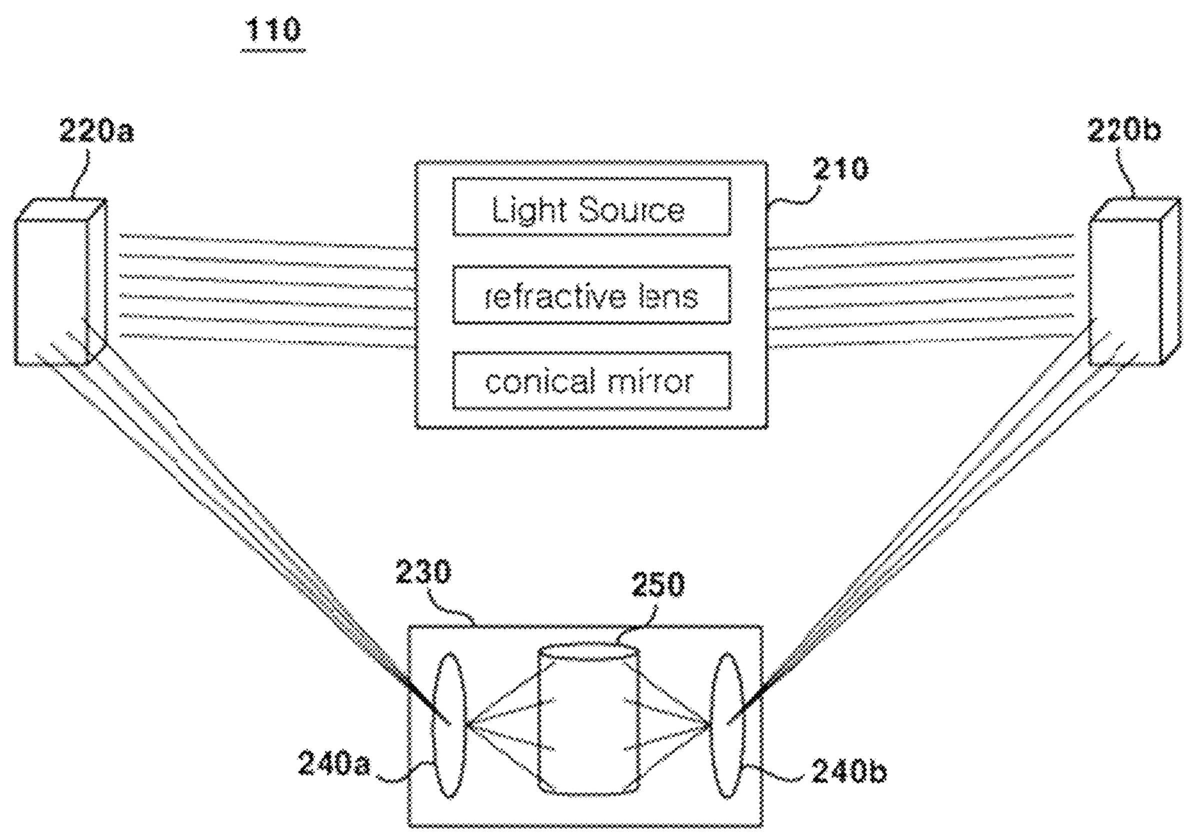
FIG. 2 is a block diagram illustrating a configuration of a 3D laser scanning apparatus illustrated in FIG. 1.

FIG. 2 is a block diagram illustrating a configuration of the 3D laser scanning apparatus illustrated in FIG. 1.

Referring to FIG. 2, the 3D laser scanning apparatus 110 includes the laser outputting device 210 and the laser receiving device 230.

The laser outputting device 210 may include a light source which outputs a laser beam, a refractive lens, and a conical mirror. Laser beams output from the light source are uniformly diffused through the refractive lens to be incident on the conical mirror. The beams incident on the conical mirror are emitted omni-directionally in 360 degrees. In the present embodiment, the refractive lens and the conical mirror are used as optical apparatuses which emit light output from a light source in 360 degrees, but the described technology is not limited thereto.

The laser beams output from the laser outputting device 210 are reflected by objects 220*a* and 220*b*, and the laser receiving device 230 receives laser beams reflected by the objects 220*a* and 220*b*.

The laser receiving device 230 includes light receiving lenses 240*a* and 240*b* and a light receiving unit 250.

The light receiving lenses 240*a* and 240*b* collect the laser beams reflected by the objects 220*a* and 220*b*, and the light receiving unit 250 receives the laser beams collected through the light receiving lenses 240*a* and 240*b*.

In one embodiment, the light receiving lenses 240*a* and 240*b* may be located on the periphery of the light receiving unit 250 to receive the laser beams from any direction of 360 degrees around the laser receiving device 230. In some embodiments, a plurality of light receiving lenses may be located on the periphery of the light receiving unit 250.

FIGS. 3 to 5 are views illustrating various embodiments of a laser receiving device.

The laser receiving device may include a plurality of light receiving lenses 240 and a light receiving unit 250, and may be embodied in various shapes as will be described below. The laser receiving device may be vertically installed above or below a laser outputting device, but the described technology is not limited thereto.

Figure 3A:
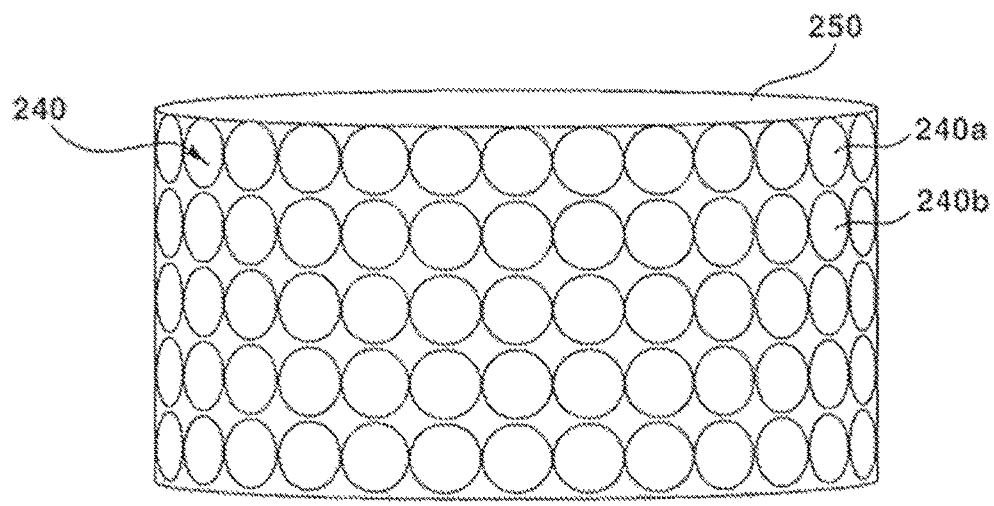
FIG. 3A is a view illustrating an example of a light receiving unit and a plurality of light receiving lenses.

FIG. 3A is a view illustrating an example of a plurality of light receiving lenses 240 and a cylindrical light receiving unit 250.

Referring to FIG. 3A, the plurality of light receiving lenses 240 are disposed on the periphery of the light receiving unit 250. The light receiving lenses 240 may collect laser beams received at a corresponding position to concentrate the laser beams on a sensor of the light receiving unit 250 corresponding to the corresponding position. Lens properties (a refraction angle, a focal distance, etc.) of the light receiving lens 240 may be designed so that laser beams are concentrated on a sensor of the light receiving unit 250 corresponding to the corresponding position.

A size of the light receiving lens 240 may vary according to embodiments. In one embodiment, the light receiving lens may have a size corresponding to a plurality of sensors. For example, when a single light receiving lens has a size which covers an area of a plurality of sensors, the corresponding light receiving lens may concentrate laser beams on the plurality of sensors.

Alternatively, the light receiving lens 240 may have a size corresponding to a single sensor. For example, when the single light receiving lens 240 has a size which covers an area of a single sensor, the corresponding light receiving lens may concentrate laser beams on the corresponding sensor.

Figure 3B:
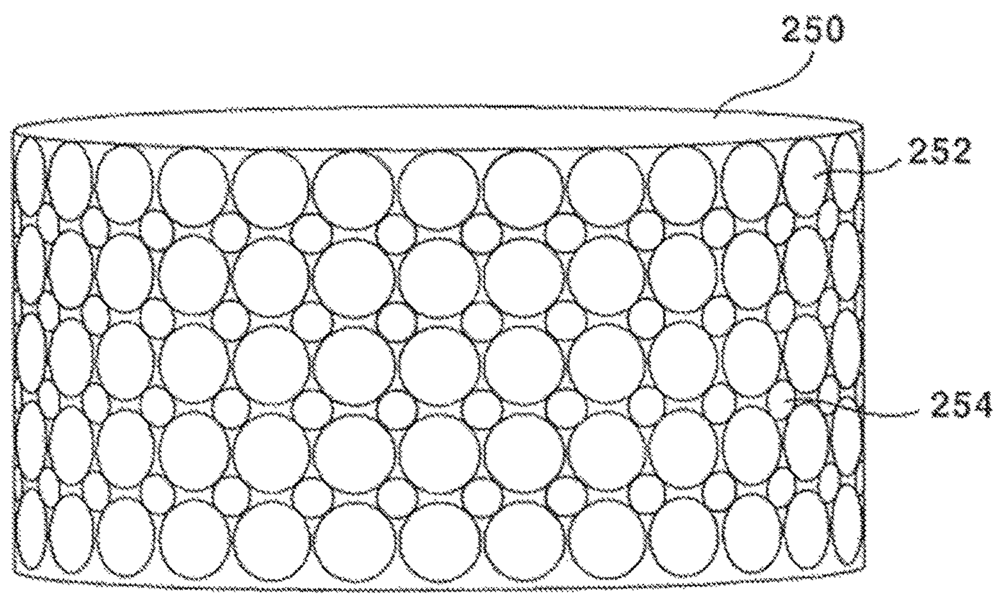
FIG. 3B is a view illustrating another example of the light receiving unit and the plurality of light receiving lenses.

FIG. 3B is a view illustrating another example of the light receiving unit and the plurality of light receiving lenses.

Referring to FIG. 3B, a plurality of light receiving lenses 252 and 254 having different sizes may be disposed on the periphery of the light receiving unit 250. For example, first light receiving lenses 252 having a first size may be disposed on the light receiving unit 250, and second light receiving lenses 254 having a second size may be disposed between the first light receiving lenses 252. The second light receiving lens 254 may correspond to a sensor located between the first light receiving lenses 252.

In one embodiment, the first light receiving lens 252 may correspond to a plurality of sensors to concentrate laser beams on the plurality of corresponding sensors. The second light receiving lens 254 may correspond to a single sensor to concentrate laser beams on the corresponding sensor. Lens properties (a refraction angle, a focal distance, etc.) of each of the first light receiving lenses 252 and the second light receiving lenses 254 may be designed so that laser beams are concentrated on the sensor of the light receiving unit 250 corresponding to the corresponding position.

In FIGS. 3A and 3B, the cylindrical light receiving units are described, but the shape of the light receiving unit may vary according to the embodiments.

Figure 4A:
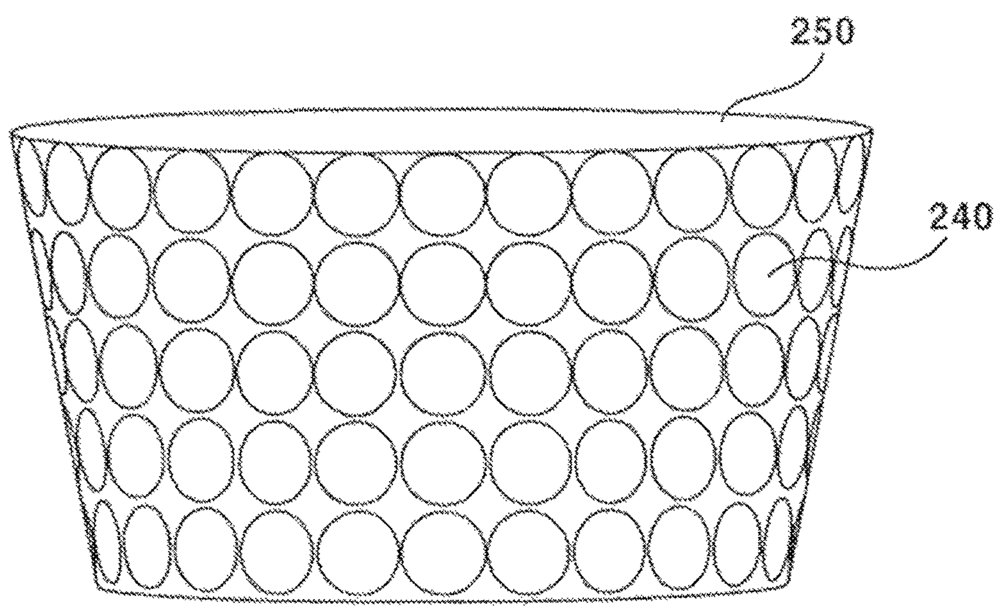
FIG. 4A is a view illustrating one embodiment of the light receiving unit.
Figure 4B:
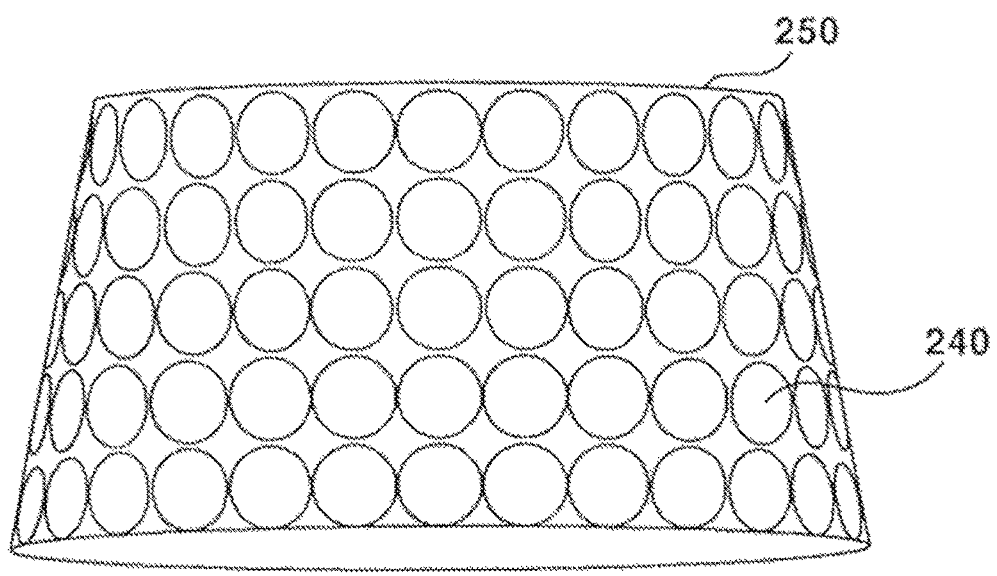
FIG. 4B is a view illustrating another embodiment of the light receiving unit.

FIGS. 4A and 4B are views illustrating examples in which a diameter of an upper surface of a light receiving unit 250 is different from a diameter of a lower surface thereof.

FIG. 4A is a view illustrating a case in which the diameter of the upper surface of the light receiving unit 250 is greater than the diameter of the lower surface thereof.

A laser receiving device may be located at a position at which a laser beam reflected by an object may be easily received, and the light receiving unit 250 may have a shape in which the laser beam may be easily received.

For example, when the laser receiving device is located above a laser outputting device, the light receiving unit 250 may have a trapezoidal cylindrical shape of which a diameter of an upper portion is greater than a diameter of a lower portion as illustrated in FIG. 4A. Light receiving lenses 240 are located at a side surface of the cylinder, and a side surface of the light receiving unit 250 is tilted downward to easily receive a laser beam received from a direction of a lower side surface.

FIG. 4B is a view illustrating a case in which the diameter of the lower surface of the light receiving unit 250 is greater than the diameter of the upper surface thereof.

When the laser receiving device is located below the laser outputting device, the light receiving unit 250 may have a trapezoidal cylindrical shape of which a diameter of a lower portion is greater than a diameter of an upper portion as illustrated in FIG. 4B. Light receiving lenses 240 are located at a side surface of the cylinder, and a side surface of the light receiving unit 250 is tilted upward to easily receive a laser beam received from a direction of an upper side surface.

In another embodiment, the light receiving unit 250 may have a cylindrical shape of which the diameter of the lower portion is the same as the diameter of the upper portion, and directions of the light receiving lenses 240 may be adjusted by control. For example, when the laser receiving device is located above the laser outputting device, the light receiving lenses 240 may be adjusted to face the direction of the lower side surface, and when the laser receiving device is located below the laser outputting device, the light receiving lenses 240 may be adjusted to face the direction of the upper side surface.

Figure 5A:
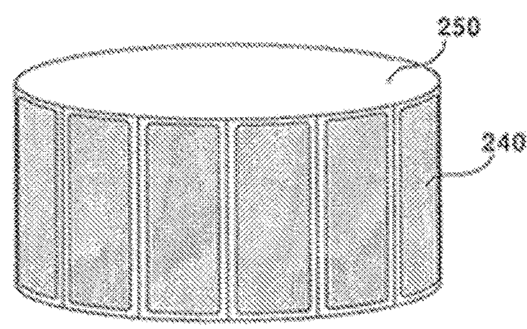
FIGS. 5A-5C are views illustrating still another embodiment of the light receiving unit.
Figure 5B:
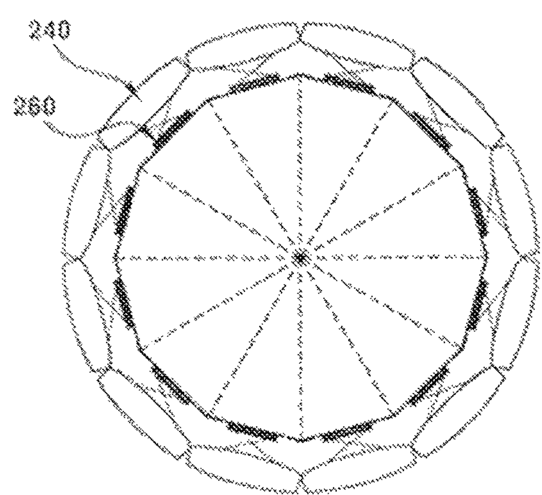
Figure 5C:
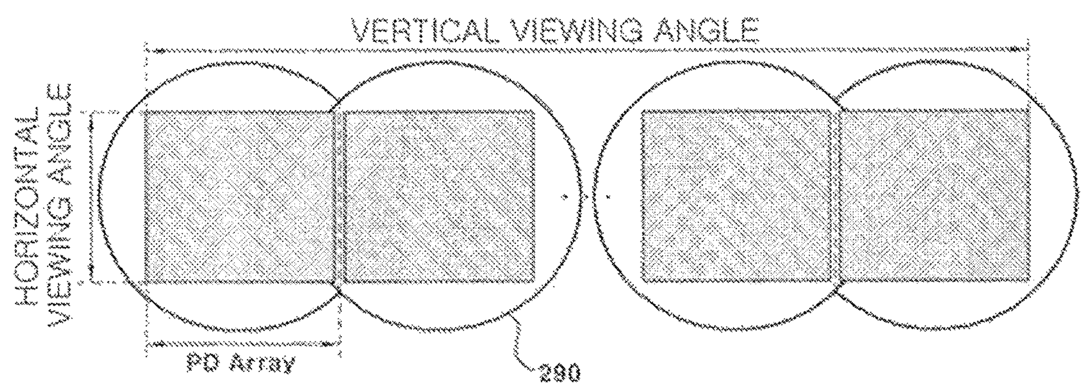

FIGS. 5A-5C are views illustrating a case in which a light receiving unit 250 of a laser receiving device has a polygonal shape, where FIG. 5A is a perspective view of the light receiving unit, FIG. 5B is a plan view of the light receiving unit, and FIG. 5C is a development view of the light receiving unit.

As illustrated in FIGS. 5A-5C, the light receiving unit 250 may be formed to have a polygonal shape, and in the present embodiment, a case in which the light receiving unit 250 has a dodecagonal shape is illustrated. With such a polygonal structure, a ToF sensor array having a horizontal viewing angle of 360 degrees may be embodied.

Referring to FIG. 5C, photodiodes (PDs) are disposed as if they are attached to each other in series without gaps. A single PD has a circular viewing angle 290, and the horizontal viewing angle may cover all directions of 360 degrees when the PDs are attached to each other in series without gaps. The PD, which is an element which detects a laser beam and converts the laser beam into an electrical signal, is used in the same sense as a sensor in the described technology.

Light receiving lenses 240 may be formed on an upper portion of each surface of the light receiving unit 250 in order to secure horizontal/vertical viewing angles of the ToF sensor, and light receiving elements 260 which receive and detect laser beams concentrated by the light receiving lenses 240 are formed on the light receiving unit 250. PDs may be used as the light receiving elements 260, and may be arranged in a focal plane array (FPA) form.

Figure 6:
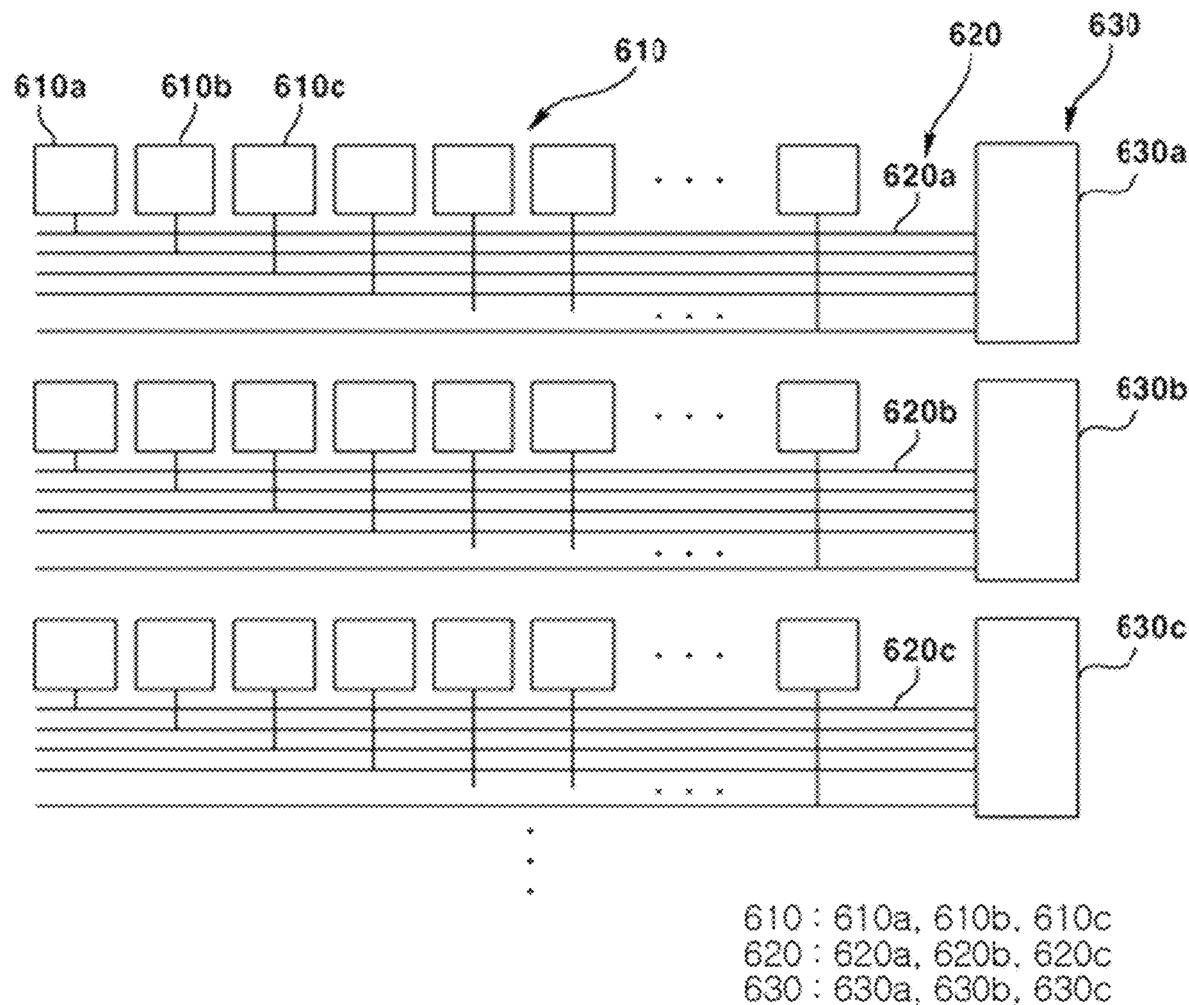
FIG. 6 is a conceptual diagram illustrating a light receiving unit according to one embodiment of the present invention.
Figure 7:
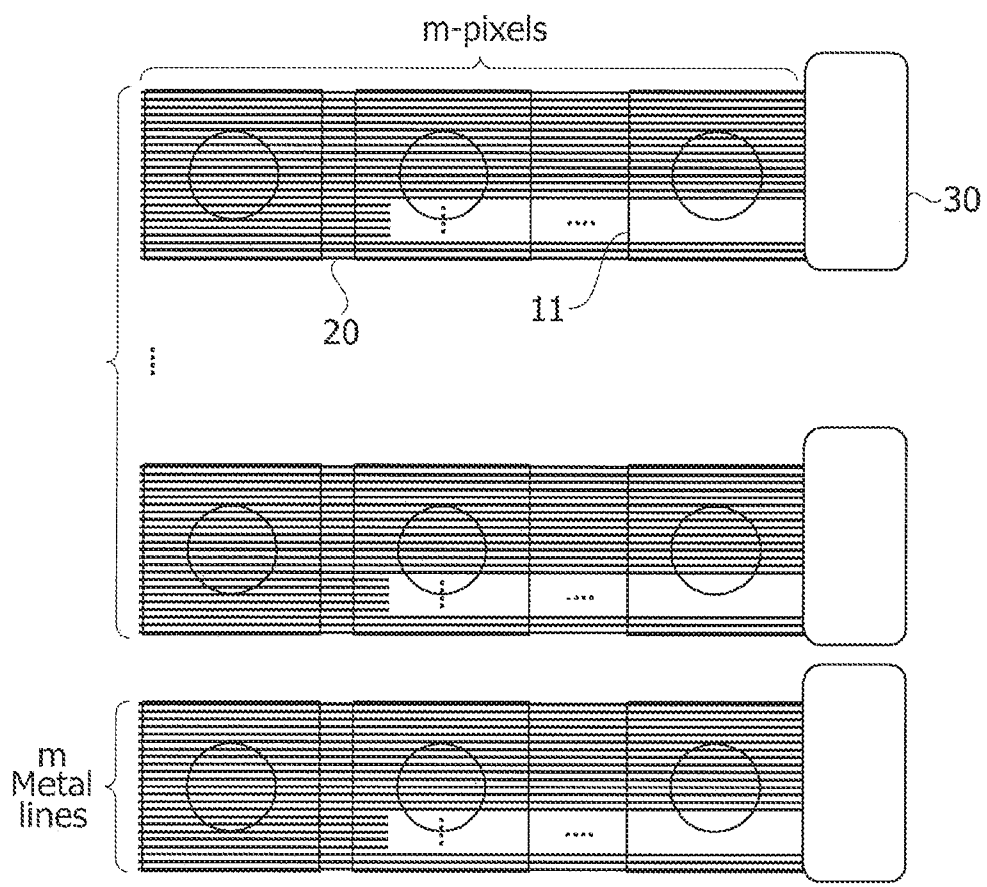
FIG. 7 is a schematic diagram illustrating a light receiving element array according to one embodiment of the present invention.
Figure 8:
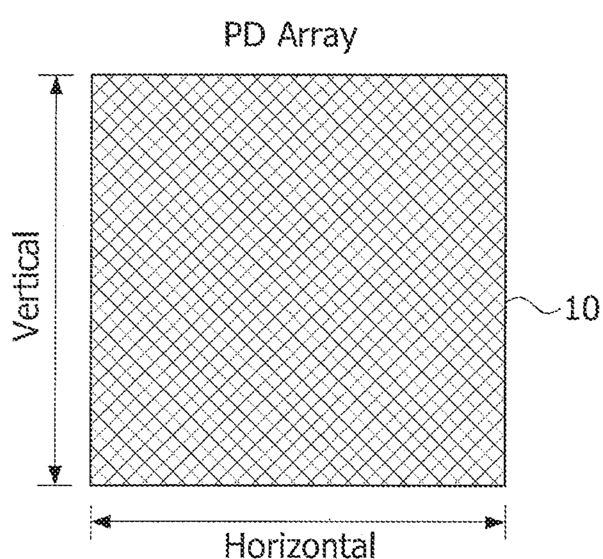
FIG. 8 is a schematic diagram illustrating the light receiving unit according to one embodiment of the present invention.
Figure 9:
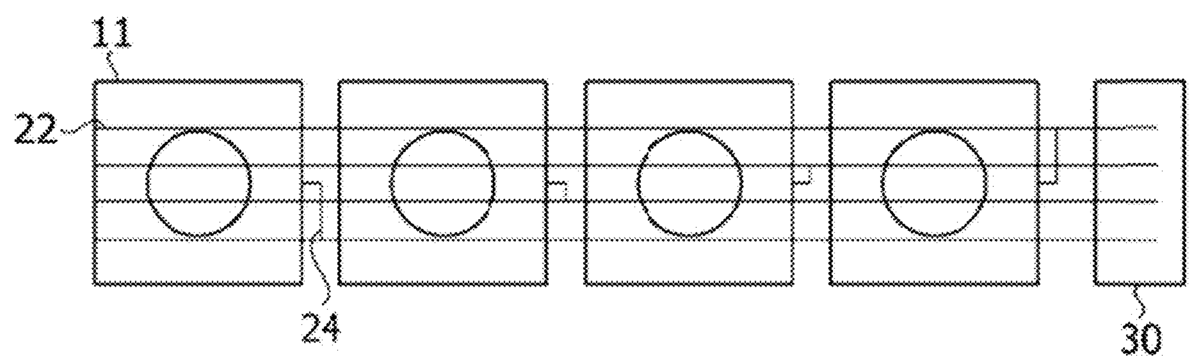
FIG. 9 is a cross-sectional view illustrating the light receiving unit according to one embodiment of the present invention.
Figure 10:
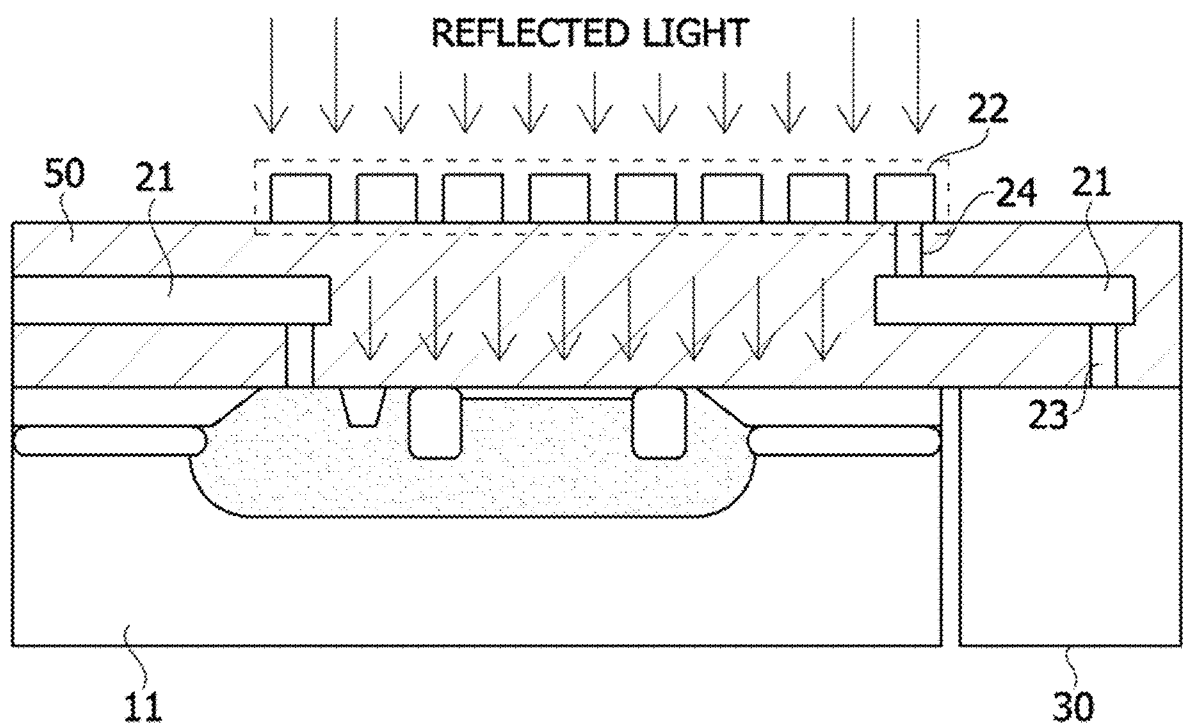
FIG. 10 is a conceptual diagram illustrating a metal line according to one embodiment of the present invention.
Figure 11:
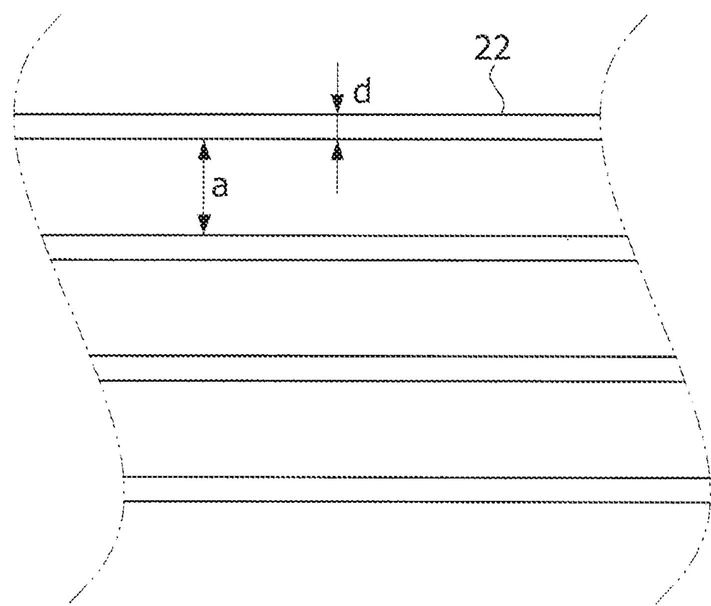
FIG. 11 is a partially enlarged view illustrating the metal line according to one embodiment of the present invention.
Figure 12:
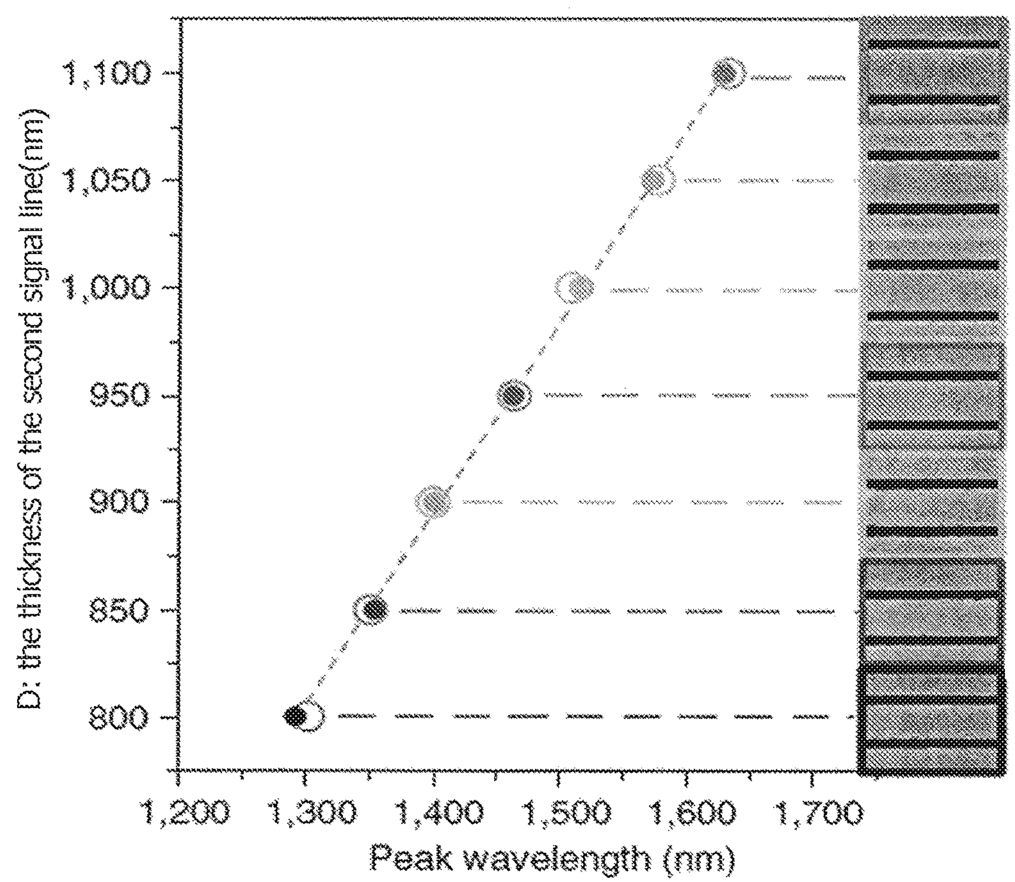
FIG. 12 to FIG. 16 are drawings for explaining a second signal line according to an embodiment of the present invention.
Figure 13:
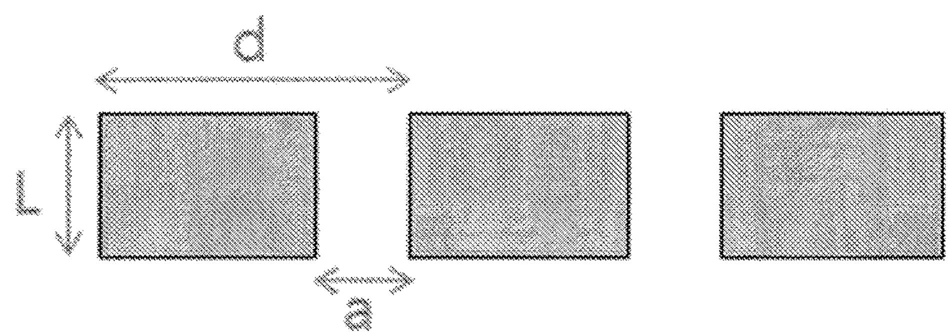

FIG. 6 is a conceptual diagram illustrating a light receiving unit according to one embodiment of the present invention, FIG. 7 is a schematic diagram illustrating a light receiving element array according to one embodiment of the present invention, FIG. 8 is a schematic diagram illustrating the light receiving unit according to one embodiment of the present invention, FIG. 9 is a cross-sectional view illustrating the light receiving unit according to one embodiment of the present invention, FIG. 10 is a conceptual diagram illustrating a metal line according to one embodiment of the present invention, and FIG. 11 is a partially enlarged view illustrating the metal line according to one embodiment of the present invention.

Referring to FIGS. 6 to 11, a light receiving unit according to one embodiment of the present invention may include a substrate, a light receiving element array 10, 610 (including 610*a*, 610*b* and 610*c* shown in replacement sheet FIG. 6) which is provided on the substrate and includes a plurality of light receiving elements 11, readout circuits 30, 630 (including 630*a*, 630*b* and 630*c* shown in replacement sheet FIG. 6) which receive electrical signals from the light receiving element 11 and perform signal processing on the electrical signals, metal lines 20, 620 (including 620*a*, 620*b* and 620*c* shown in replacement sheet FIG. 6) which are disposed on the light receiving element array 10, 610 in parallel, are provided to correspond to the number of the light receiving elements 11, and connect the light receiving elements 11 to the readout circuits 30, 630 in one-to-one correspondence, and an insulating layer 50.

In the light receiving element array 10, m×n light receiving elements 11 may be arranged on the substrate in a matrix form. PDs may be used as the light receiving elements 11, and the light receiving elements 11 may detect light incident from the outside by independently operating, and may convert the light into electrical signals. The electrical signals converted by the light receiving elements 11 are transferred to the readout circuits 30 through the metal lines 20.

In this case, since the light receiving elements 11 and the metal lines 20 are connected to each other in one-to-one correspondence, the electrical signals may be transferred to the readout circuits 30 through the metal lines 20 which are individually connected even when the light receiving elements 11 simultaneously detect the light.

Each of the metal lines 20 may include a first signal line 21 connected to an active area of the light receiving element 10 and the readout circuit 30, and second signal lines 22 arranged on the first signal line 21 and the active area of the light receiving element 11 in parallel. The first signal line 21 of the metal line 20 and the readout circuit 30 are electrically connected to each other through a contact 23, and the first signal line 21 and the second signal lines 22 are electrically connected to each other through a via 24. The first signal line 21 and the second signal lines 22 are horizontally arranged in a direction from the light receiving element 10 toward the readout circuit 30, and may be electrically connected to each other using the contact 23 and the via 24 which are disposed in a direction perpendicular to the arrangement direction of the first signal line 21 and the second signal lines 22.

A thickness D of the second signal line 22 and an arrangement interval a between the signal lines may be determined by a cut-off wavelength band. The second signal line 22 may serve as a filter so that light in a wavelength band other than a wavelength band output from the laser outputting device is blocked in order to block light in a wavelength band other than reflected light. In this case, the passed wavelength band may be determined by the thickness D of the second signal line 22 and the arrangement interval a between the signal lines. In one embodiment of the present invention, the thickness d and the arrangement interval a between the signal lines may be determined so that the second signal line 22 blocks light other than light in a wavelength band of 905 nm or 1550 nm.

FIG. 12 to FIG. 16 are drawings for explaining a second signal line according to an embodiment of the present invention.

In FIG. 12 to FIG. 16, D represents a thickness of the second signal line 22, L represents a height of the second signal line 22, and a represents an arrangement interval between the second signal lines 22.

Figure 14:
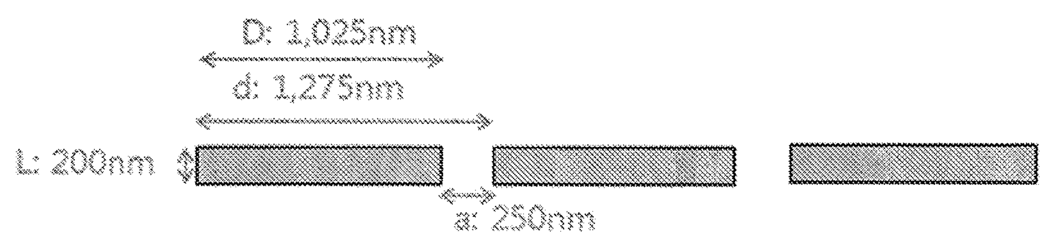
Figure 16:
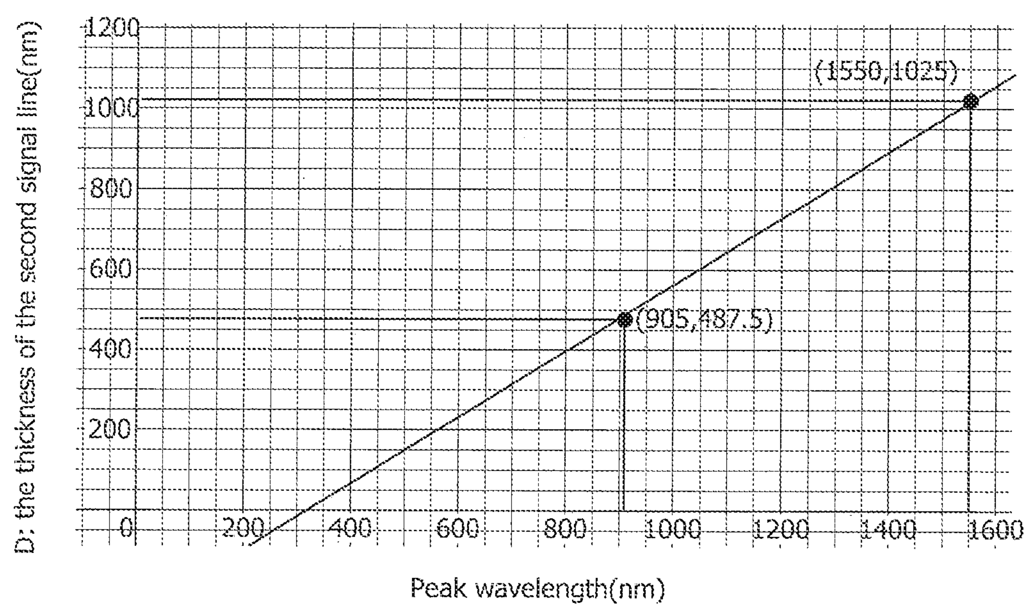

Referring to FIG. 14 and FIG. 16, in order to transmit a reflected light in a wavelength band of 1,550 nm and block the light in other wavelength bands, a value of D can be set to 1,025 nm, and a value of a can be set to 250 nm, and in this case, an arrangement period d of the second signal line can be set to 1,275 nm. A value of the height L of the second signal line can be set to 200 nm, but the value of the height may be variable.

Figure 15:
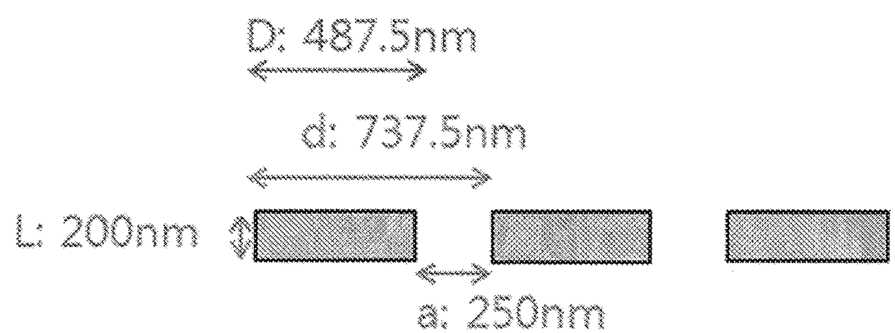

Referring to FIG. 15 and FIG. 16, in order to transmit a reflected light in a wavelength band of 905 nm and block the light in other wavelength bands, the value of D can be set to 487.5 nm, and the value of a can be set to 250 nm, and in this case, the arrangement period d of the second signal line can be set to 737.5 nm. The value of the height L of the second signal line can be set to 200 nm, but the value of the height may be variable.

As can be seen in the above, it is possible to realize filter effect for various wavelength bands without additional components through setting the value of the thickness, the arrangement interval, and the arrangement period of the second signal line.

The insulating layer 50 may be provided between the second signal lines 22 and the light receiving element array 10. The insulating layer 50 blocks electrical contact between the second signal lines 22 and the light receiving element 11, and thus the second signal lines 22 are electrically connected to the light receiving element 11 through the first signal line 21.

When a layout of the metal lines is formed with a conventional method, there is a problem in that a volume of a chip is increased. Since the metal lines have to be disposed so that the number of the metal lines is the same as the number of the light receiving elements, there is a problem in that the number of the metal lines is increased and as a result, the volume thereof is increased.

A method of stacking metal lines in multiple layers may be considered to address these problems. However, when the metal lines are stacked in multiple layers, since the metal lines are disposed on PDs, there is a problem in that the PDs do not properly receive light.

In the described technology, the metal lines 20 may be provided on the light receiving element array to address this problem, and thus a space in which the metal lines are disposed may be reduced.

In the 3D laser scanning apparatus according to one embodiment of the present invention and the 3D laser scanning system including the same, it is possible to scan omni-directionally in 360 degrees using a laser beam source.

Further, it is possible to scan omni-directionally in 360 degrees without mechanical rotation, fundamentally address a problem of a viewing update period, and reduce manufacturing costs without reducing performance.

Further, it is possible to readout simultaneously while minimizing a chip area, block a signal in a noise wavelength band according to an arrangement of metal lines, and receive a signal in a desired wavelength band.

While the example embodiments of the inventive technology and their advantages have been described above in detail, it should be understood that various changes, substitutions, and alterations may be made herein by those skilled in the art without departing from the scope of the invention as defined by the following claims.

What is claimed is:

1. A light detection and ranging (LIDAR) time of flight (ToF) sensor for inputting and outputting simultaneously, the sensor comprising:

a substrate;

a light receiving element array provided on the substrate and including a plurality of light receiving elements;

readout circuits configured to receive electrical signals from the light receiving elements and perform signal processing on the electrical signals; and metal lines disposed on the light receiving element array in parallel, provided to correspond to the number of the light receiving elements, and configured to connect the light receiving elements to the readout circuits in one-to-one correspondence, wherein the metal lines include a first signal line connected to an active area of the light receiving elements and the readout circuits, and second signal lines arranged on the first signal line and the active area of the light receiving elements in parallel, wherein the metal lines include a contact which electrically connects the first signal line to the readout circuits and a via which electrically connects the first signal line to the second signal lines, and wherein a thickness of each of the second signal lines and an arrangement interval between the signal lines are determined by a cut-off wavelength band so that the received laser beam is incident on the active area of the light receiving element without interfering with the second signal lines.

2. The sensor of claim 1, wherein the thickness of each of the second signal lines and the arrangement interval between the signal lines are determined so that light other than light in a wavelength band of 905 nm or 1,550 nm is blocked.

3. The sensor of claim 1, further comprising an insulating layer provided between the second signal lines and the light receiving element array.

* * * * *